United States Patent
Agarwal et al.

(10) Patent No.: US 12,146,814 B2
(45) Date of Patent: Nov. 19, 2024

(54) SYSTEMS AND METHODS FOR DETECTING WATER LEAKS AND/OR PREVENTING WASTE WATER OVERFLOW

(71) Applicant: B/E AEROSPACE, INC., Winston Salem, NC (US)

(72) Inventors: Hardik Agarwal, Siliguri (IN); Manjunath Hiremath, Bangalore (IN); Chethana Shivappa, Bangalore (IN); Narain Adhinarayanan, Bangalore (IN)

(73) Assignee: B/E AEROSPACE, INC., Winston Salem, NC (US)

(*) Notice: Subject to any disclaimer, the term of this patent is extended or adjusted under 35 U.S.C. 154(b) by 175 days.

(21) Appl. No.: 17/848,868

(22) Filed: Jun. 24, 2022

(65) Prior Publication Data
US 2023/0160772 A1 May 25, 2023

(30) Foreign Application Priority Data
Nov. 24, 2021 (IN) .............................. 202141054170

(51) Int. Cl.
*G01M 3/24* (2006.01)
*B64D 11/02* (2006.01)
(Continued)

(52) U.S. Cl.
CPC .............. *G01M 3/24* (2013.01); *B64D 11/02* (2013.01); *G01F 23/0007* (2013.01); *E03D 11/13* (2013.01)

(58) Field of Classification Search
None
See application file for complete search history.

(56) References Cited

U.S. PATENT DOCUMENTS 3,995,328 A * 12/1976 Carolan ................. B64D 11/02
  210/167.01
4,042,497 A * 8/1977 Maltby ................... C02F 3/046
  210/744

(Continued)

FOREIGN PATENT DOCUMENTS

CN    112483908    3/2021
WO    2002006594   1/2002
(Continued)

OTHER PUBLICATIONS

Saurabh Sinha; "Choked toilet overflows on Al's London to Delhi flight"; The Times of India, dated Feb. 14, 2019, New Delhi, India: https://timesofindia.indiatimes.com/city/delhi/choked-toilet-overflows-on-flight-from-uk/articleshow/67983253.cms, 2 Pages.
(Continued)

*Primary Examiner* — Patrick Assouad
*Assistant Examiner* — Mark A Shabman
(74) *Attorney, Agent, or Firm* — SNELL & WILMER L.L.P.

(57) ABSTRACT

A leak and/or overflow detection system for an aircraft may comprise a first sensor configured to be disposed in a toilet bowl, a second sensor configured to be disposed in a waste tank, a first acoustic emission sensor and a second acoustic emission sensor configured to be disposed upstream and downstream of a valve, or any combination of the first sensor, the second sensor, and the acoustic emission sensors. A controller may receive various data from the sensors and determine whether a leak and/or an overflow condition is occurring or about to occur.

14 Claims, 4 Drawing Sheets

(51) Int. Cl.
 *E03D 11/13* (2006.01)
 *G01F 23/00* (2022.01)

(56) References Cited

U.S. PATENT DOCUMENTS

| | | | |
|---|---|---|---|
| 5,051,921 A * | 9/1991 | Paglione | G01F 23/268 |
| | | | 73/304 C |
| 5,133,212 A * | 7/1992 | Grills | G01F 23/20 |
| | | | 177/136 |
| 5,305,792 A | 4/1994 | Ellgoth et al. | |
| 5,732,417 A * | 3/1998 | Pondelick | E03F 1/006 |
| | | | 4/431 |
| 6,178,569 B1 | 1/2001 | Quintana | |
| 6,227,490 B1 | 5/2001 | Marcellus | |
| 6,393,635 B2 | 5/2002 | Rozenblatt | |
| 7,057,507 B1 * | 6/2006 | Sandifer | G08B 21/20 |
| | | | 73/40 |
| 8,185,977 B2 | 5/2012 | Seibt | |
| 8,806,946 B2 | 8/2014 | Flister et al. | |
| 9,448,563 B2 | 9/2016 | Goeschel et al. | |
| 9,593,476 B2 | 3/2017 | Rieger et al. | |
| 10,266,268 B2 | 4/2019 | Boodaghians et al. | |
| 10,816,371 B2 | 10/2020 | Ratliff et al. | |
| 2004/0128034 A1 | 7/2004 | Lenker et al. | |
| 2006/0174707 A1 | 8/2006 | Zhang | |
| 2015/0006091 A1 * | 1/2015 | Schoonover | G05B 9/02 |
| | | | 702/39 |
| 2016/0289945 A1 | 10/2016 | Seneff | |
| 2020/0392710 A1 * | 12/2020 | Saruta | G01F 23/802 |

FOREIGN PATENT DOCUMENTS

| | | |
|---|---|---|
| WO | 2006042053 | 4/2006 |
| WO | 2011012459 | 2/2011 |
| WO | 2012146632 | 11/2012 |

OTHER PUBLICATIONS

Tanya Edwards; "American Airlines flight attendant told passenger to go in a bag after plane's toilets overflow"; Yahoo Finance, dated Sep. 8, 2018: https://finance.yahoo.com/news/american-airlines-flight-attendant-told-passenger-go-bag-planes-toilets-overflow-164335360.html?_guc_consent_skip=1670256953, 3 Pages.

Associated Press; "Continental apologizes for sewage overflow"; NBC News, dated Jun. 21, 2007: https://www.nbcnews.com/id/wbna 19353374, 3 Pages.

Marwa Eltagouri; "A Delta flight with broken toilets diverts hundreds of miles to offer passengers a bathroom break"; The Washington Post, dated Dec. 6, 2017: https://www.washingtonpost.com/news/dr-gridlock/wp/2017/12/06/a-delta-flight-with-broken-toilets-diverts-hundreds-of-miles-to-offer-passengers-a-bathroom-break/, 2 Pages.

Gills Sensors & Control, "7014 Waste Water Level Sensor", https://www.gillsc.com/products/level-sensors/wastewater/, retrieved Dec. 13, 2022, 4 pages.

European Patent Office, European Search Report dated Jul. 31, 2023 in Application No. 222094567.

European Patent Office, European Partial Search Report dated Mar. 14, 2023 in Application No. 222094567.

* cited by examiner

FIG. 4 ered in connection with the following figures, wherein like numerals denote like elements.

SYSTEMS AND METHODS FOR DETECTING WATER LEAKS AND/OR PREVENTING WASTE WATER OVERFLOW

CROSS-REFERENCE TO RELATED APPLICATIONS

This application claims priority to, and the benefit of, India Patent Application No. 202141054170, filed Nov. 24, 2021 (DAS Code 9E5B) and titled "SYSTEMS AND METHODS FOR DETECTING WATER LEAKS AND/OR PREVENTING WASTE WATER OVERFLOW," which is incorporated by reference herein in its entirety for all purposes.

FIELD

The present disclosure relates to drain systems and methods for improved overflow detection and, more particularly, improved waste water overflow detection systems and methods for use in aircraft lavatories.

BACKGROUND

Aircraft cabins include lavatories having drain systems disposed therein. The waste water drain system may result in waste water overflow due to a faulty rinse valve being stuck in an open condition, or the like. In such a condition, waste water may flow continuously into an aircraft lavatory. Additionally, typical waste volume detection in a waste collection tank may be prone to generating erroneous readings. An overflow condition is often detected by passengers in a manual manner.

SUMMARY

A system is disclosed herein. The system may comprise: a first sensor disposed in a first toilet bowl; a display device; and a controller electronically coupled to the first sensor, the controller configured to: receive, via the first sensor, a first signal indicating the first sensor is exposed to water, and transmit a second signal to the display device indicating an overflow condition is about to occur in the first toilet bowl.

In various embodiments, the system further comprises a second toilet bowl comprising a second sensor, wherein the first sensor and the second sensor are water sensors. The first toilet bowl may be disposed in a first lavatory on an aircraft and the second toilet bowl is disposed in a second lavatory on the aircraft. The controller may be configured to determine a location of the first sensor in response to receiving the first signal and transmit the location to the display device to be displayed. The system may further comprise a first acoustic emission (AE) sensor and a second AE sensor electronically coupled to the controller, the first AE sensor and the second AE sensor configured to be coupled to a fluid conduit. The controller may be configured to receive, via the first AE sensor and the second AE sensor, acoustic data. The system may further comprise a second sensor disposed in a waste tank, the waste tank in fluid communication with the first toilet bowl during operation, the second sensor electronically coupled to the controller, the second sensor configured to measure a wastewater level in the waste tank and send to the controller.

A leak detection system is disclosed herein. The leak detection sensor may comprise: a fluid conduit; a valve disposed at least partially within the fluid conduit; a first acoustic emission sensor coupled to the fluid conduit upstream of the valve; a second acoustic emission sensor coupled to the fluid conduit downstream of the valve; and a controller in electronic communication with the first acoustic emission sensor and the second acoustic emission sensor, the controller configured to determine a leak at the valve in response to acoustic data received from the first acoustic emission sensor and the second acoustic emission sensor.

In various embodiments, the fluid conduit extends from a toilet bowl to a waste tank. The toilet bowl may be disposed in a lavatory of an aircraft. The leak detection system may further comprise a display device, the controller in electric communication with the display device, the controller configured to send an indication to the display device in response to determining the leak at the valve. The controller may be further configured to send a signal to the valve to close the valve in response to detecting the leak. A plumbing system may comprise a first lavatory and a second lavatory having the leak detection system. The controller may be configured to determine whether the first lavatory or the second lavatory has the leak.

An aircraft is disclosed herein. The aircraft may comprise: a toilet bowl disposed in a lavatory; a waste tank; a fluid conduit extending from the toilet bowl to the waste tank; a valve disposed in the fluid conduit, the valve configured to transition from a closed state to an open state to fluidly couple the toilet bowl to the waste tank; a waste water level sensor disposed in the waste tank, the waste water level sensor configured to measure a waste water level within the waste tank; a controller electronically coupled to the waste water level sensor, the controller configured to: receive, via the waste water level sensor, the waste water level in the waste tank, and transmit an indication to a display device in response to the waste water level exceeding a threshold level.

In various embodiments, the aircraft may further comprise a second sensor disposed in the toilet bowl, the second sensor comprising a water sensor. The second sensor may be disposed inside the toilet bowl at a height above an estimated maximum waste water threshold during operation of the toilet bowl. The waste water level sensor may comprises a fluorinated ethylene propylene (FEP) coating. The aircraft may further comprise a first acoustic emission sensor disposed upstream of the valve, the first acoustic emission sensor in electronic communication with the controller, the controller configured to determine a leak in the fluid conduit. The aircraft may further comprise a second acoustic emission sensor disposed downstream of the valve, the second acoustic emission sensor in electronic communication with the controller, the controller configured to determine the leak in the fluid conduit based on measurements form the first acoustic emission sensor and the second acoustic emission sensor.

The forgoing features and elements may be combined in various combinations without exclusivity, unless expressly indicated herein otherwise. These features and elements as well as the operation of the disclosed embodiments will become more apparent considering the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when con

DETAILED DESCRIPTION

The detailed description of exemplary embodiments herein refers to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Overflow of a toilet bowl may lead to discomfort, inconvenience to passengers, blockage of lavatory use, etc. Leakage due to a malfunctioning rinse valve may cause a toilet drainage system to continuously run and lead to an emptying of clean water and filling of a waste tank. Similarly, erroneous readings of waste level in a waste tank may lead to blocking a lavatory use unnecessarily, resulting in discomfort of passengers due to long wait lines or the like. Overflow conditions of typical plumbing systems are manually detected (e.g., via a passenger or service person upon an aircraft).

Disclosed herein is waste water overflow and/or leakage detection systems and method for use in aircrafts. In various embodiments, the waste water leakage detection system may comprise a first acoustic emission (AE) sensor, a second AE sensor, a rinse valve, and a fluid conduit. The valve is disposed within the fluid conduit. The first AE sensor is disposed upstream of the valve and the second AE sensor is disposed downstream of the valve. In this regard, measurements from the first AE sensor and the second AE sensor may be compared and/or analyzed (e.g., by a processor), to determine whether fluid is leaking past the valve, in accordance with various embodiments. In various embodiments, the waste water leakage detection system may facilitate real-time and/or accurate leakage data (e.g., via pattern recognition or the like). In various embodiments, in response to the waste water leakage detection system determining a leak (e.g., due to a faulty valve), the system may be configured to identify the leakage location (e.g., which lavatory or fixture in a lavatory), a mass flow rate of leakage, and/or send an indication signal to a crew member, in accordance with various embodiments. In this regard, the rinse valve and manual inlet valve may be closed prior to or shortly after an overflow condition occurring.

In various embodiments, the overflow detection system may comprise a first sensor disposed in a toilet bowl and a second sensor disposed in a waste water tank. The first sensor may be configured to detect when a water level has been exceeded within the toilet bowl. In this regard, the first sensor may comprise a water sensor. The water sensor may be configured to detect when the sensor is exposed to water. In this regard, the water sensor may be disposed at a predetermined height in the toilet bowl and send a signal to the overflow detections system in response to being exposed to water.

The second sensor may be configured to detect a waste level in the waste water tank. The second sensor may comprise a coating disposed thereon. In various embodiments, the coating may comprise fluorinated ethylene propylene (FEP). In this regard, the coating may be configured to prevent adhesion to the second sensor. In this regard, the second sensor may be configured to prevent adhesion and/or accumulation of waste water on the second sensor, thus preventing false readings and resulting in greater accuracy, in accordance with various embodiments.

Figure 1:
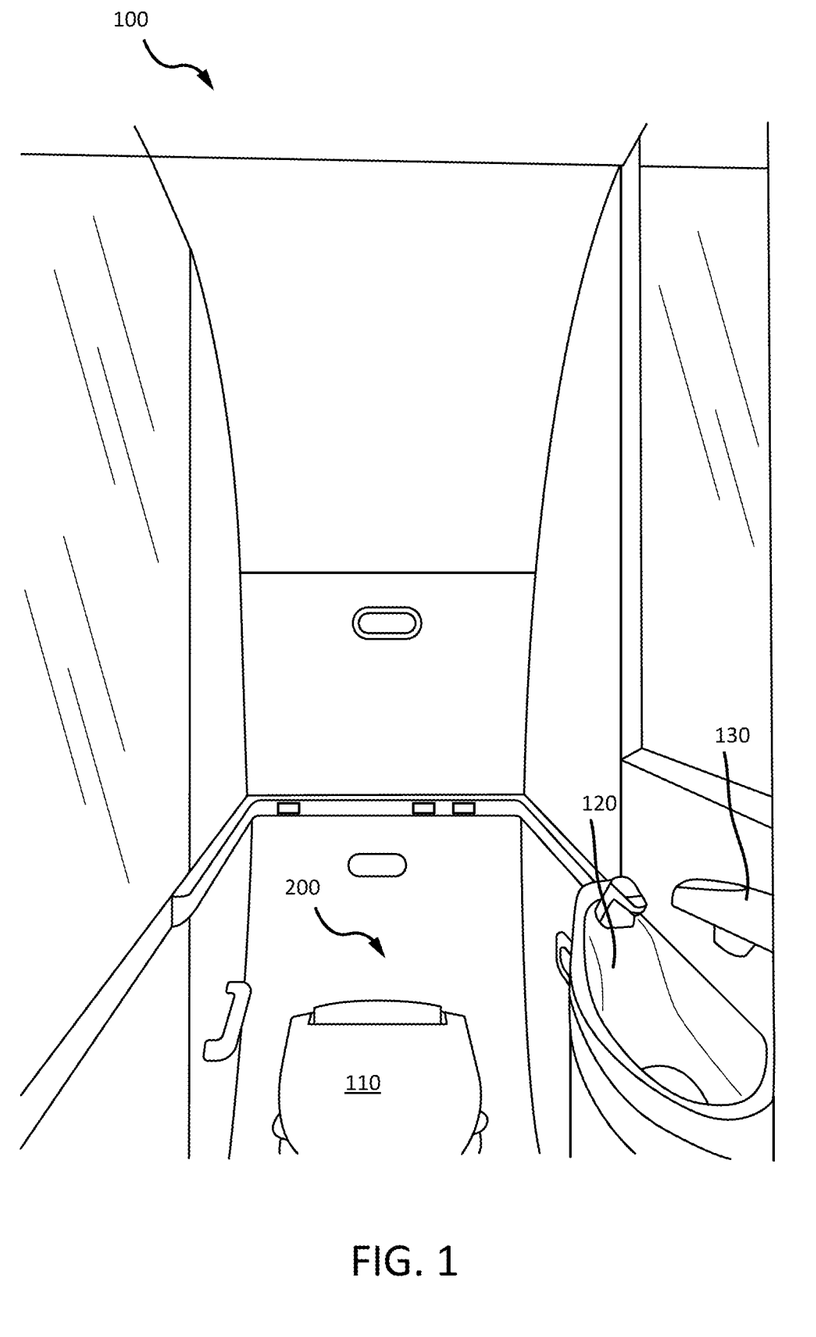
- FIG. 1 illustrates a perspective view of a lavatory for an aircraft, in accordance with various embodiments.

Referring now to FIG. 1, a perspective view of a lavatory 100 of an aircraft is illustrated in accordance with various embodiments. The lavatory 100 comprises a toilet 110, a water basin 120 (e.g., a sink), and a faucet 130. In various embodiments, the lavatory 100 further comprises a plumbing system 200. The plumbing system 200 is in fluid communication with the toilet 110, the water basin 120, and the faucet 130. In this regard, in response to flushing the toilet 110, waste water may be transferred throughout the plumbing system 200 as described further herein. Similarly, in response to running water via the faucet 130, waste water may be transferred throughout the plumbing system 200 as described further herein.

Figure 2:
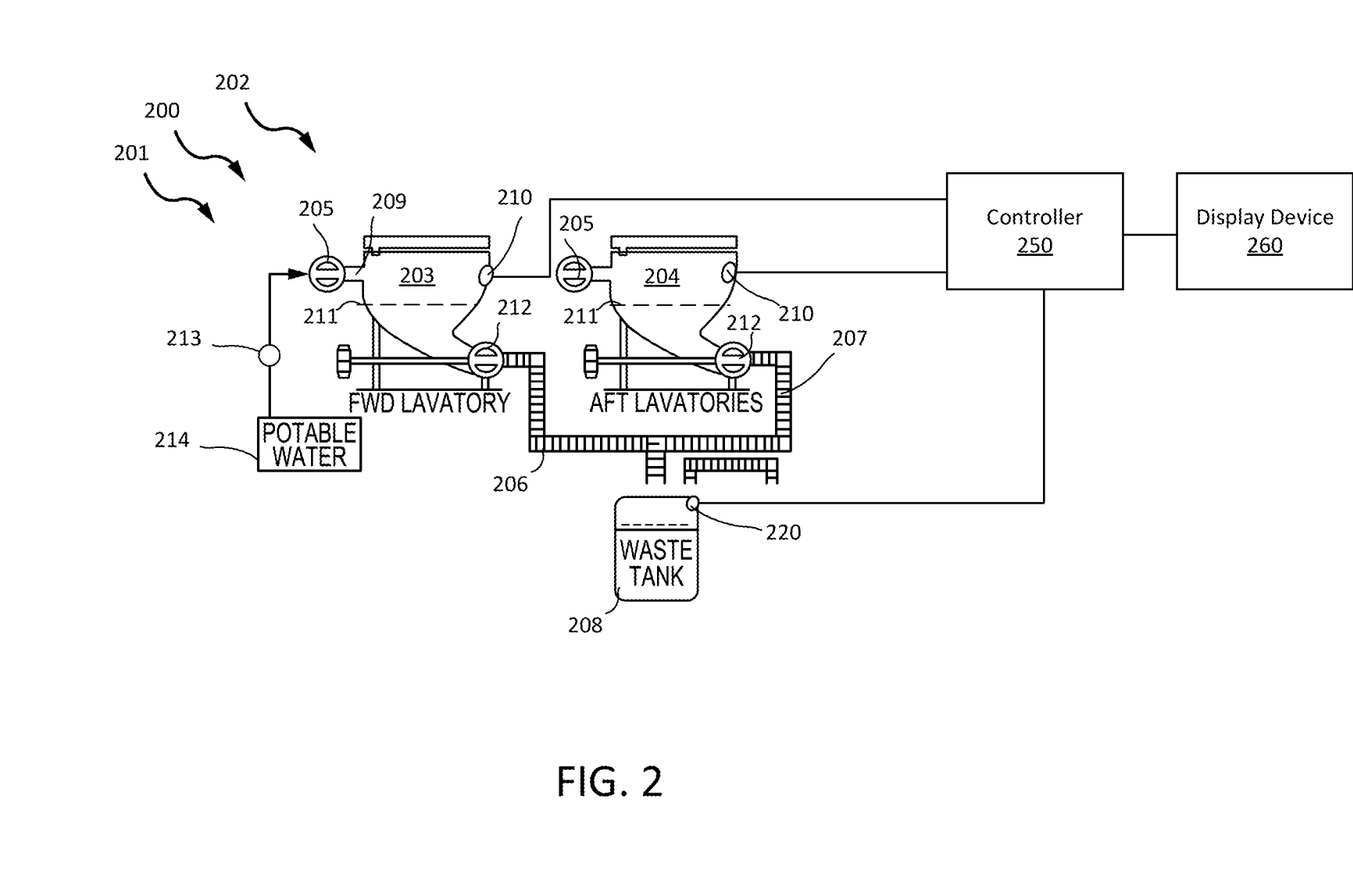
FIG. 2 illustrates a schematic view of an overflow detection system, in accordance with various embodiments.

Referring now to FIG. 2, a plumbing system 200 comprising an overflow detection system 201 and a leakage detection system 202 is illustrated, in accordance with various embodiments. In various embodiments, the plumbing system 200 comprises a rinse valve 205 associated with each toilet bowl (e.g., toilet bowls 203, 204). The rinse valve 205 is configured to open in response to external activation (e.g., via flushing of a handle, via a sensor detecting a person is no longer in front of the sensor, or the like). In response to opening the rinse valve 205, waste water (e.g., potable water) may flow (e.g., via fluid conduits 209) from a potable water tank 214 to a toilet bowl 203 or toilet bowl 204. In various embodiments, during the flushing process, waste water may be dispensed through a fluid conduits 206, 207 from each toilet bowl (e.g., toilet bowls 203, 204) to the waste tank 208. In this regard, any solid waste may be transported from the toilet bowl (e.g., toilet bowl 203 or toilet bowl 204) to the waste tank 208 as waste water, in accordance with various embodiments.

In various embodiments, the overflow detection system 201 comprises a first sensor 210 configured to be disposed in each toilet bowl (e.g., first toilet bowl 203 and second toilet bowl 204) of the plumbing system 200. In various embodiments, a plurality of the first sensor 210 may be disposed around (e.g., partially or fully) a circumference of a respective toilet bowl (e.g., toilet bowls 203, 204). The present disclosure is not limited in this regard.

In various embodiments the first sensor 210 is in electronic (i.e., electrical or wireless) communication with a controller 250. In various embodiments, controller 250 may be integrated into computer system of the aircraft. In various embodiments, controller 250 may be configured as a central network element or hub to access various systems and components of the overflow detection system 201 and/or the leak detection system 202. Controller 250 may comprise a network, computer-based system, and/or software components configured to provide an access point to various systems and components of the overflow detection system 201 and/or the leak detection system 202. In various embodiments, controller 250 may comprise a processor. In various embodiments, controller 250 may be implemented in a single processor. In various embodiments, controller 250 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 250 may comprise a processor configured to implement various logical operations in response to execution of instructions, for example, instructions stored on a non-transitory, tangible, computer-readable medium configured to communicate with controller 250.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the first sensor is spaced apart vertically from an estimated maximum water level 211 during use of each toilet bowl (e.g., toilet bowls 203, 204). In this regard, the first sensor 210 may be prevented from activation during normal operation of the plumbing system 200. In various embodiments, the first sensor 210 is a water sensor (i.e., configured to detect water). The first sensor 210 is configured to send a signal the controller 250 in response to detecting water. In this regard, in response to water in the toilet bowl (e.g., toilet bowl 203 or toilet bowl 204) reaching a level of the first sensor 210, the first sensor 210 sends an indication to the controller 250. The controller may be configured to determine from the signal sent by the first sensor 210 a location of the sensor (e.g., in a forward lavatory, aft lavatory, or the like) and send an indication to a display device (or indicator) that an overflow condition has occurred. In this regard a crew member may be notified (e.g., via the display device) that a toilet bowl (e.g., toilet bowl 203 or toilet bowl 204) is experiencing an overflow condition (i.e., water has extended vertically past the first sensor 210), and in which lavatory the overflow is occurring. Thus, the controller 250 may determine, based on which sensor 210 the signal is received from, which lavatory has a toilet bowl (e.g., toilet bowl 203 or toilet bowl 204) that is about to experience an overflow condition. Thus, in response to a crew member seeing the indication, the crew member may manually close an inlet shutoff valve 213. The inlet shutoff valve 213 is disposed fluidly between the potable water tank 214 and the rinse valve 205. In this regard, the inlet shutoff valve prevents potable water from flowing into the toilet bowl 203 in response to being in a closed position. In various embodiments, the controller 250 may be in electronic communication with the valve 205. Thus, in various embodiments, the controller 250 may be configured to command the valve 205 to close in response to receiving a signal from the first sensor 210 via a secondary closing mechanism (e.g., a closing mechanism independent of a primary closing mechanism for the valve 205).

In various embodiments, the second sensor 220 is disposed within the waste tank 208. The second sensor 220 may also be in electronic communication with the controller 250. In various embodiments, the second sensor 220 comprises a waste water level sensor. The waste water level sensor may extend from a top portion of the waste tank 208 towards a bottom portion of the waste tank 208. In this regard, the waste tank 208 may continuously provide a waste water level in the waste tank 208 to the controller 250. Thus, in response to a waste level exceeding a predetermined threshold (e.g., 100% vertical height of the waste water level sensor), the controller 250 may send a signal to the display device 260. Thus, the crew may be informed that the waste tank is full and appropriate actions may be taken. In various embodiments, the controller 250 may be configured to send a warning signal at a predetermined level (e.g., 80% vertical height of the waste water level sensor) to indicate the waste tank should be emptied soon.

In various embodiments, the waste water level sensor may comprise an FEP coating disposed therein. The FEP coating may provide excellent abrasion resistance due, at least in part, to being non-porous, chemical resistant, having a low coefficient of friction, etc., in accordance with various embodiments. In various embodiments, the FEP coating may be between 0.5 mm (0.2 in) and 5 mm (2.0 in) thick, or between 1 mm (0.4 in) and 2 mm (0.8 in) thick, or approximately 1.5 mm (0.6 in) thick. The FEP coating may prevent erroneous readings experienced by typical point level sensors, in accordance with various embodiments. In particular, the FEP coating may provide a non-stick measurement probe without holes, moving parts, hidden voids, or the like. Thus, build up on the second sensor 220 may be prevented or significantly minimized, preventing inaccurate measurements, erroneous readings, or the like. In various embodiments, the waste level sensor may be a conductive sensor, facilitating use within waste tank 208 regardless of material type and regardless of any film that may build up on the walls of the waste tank 208.

In various embodiments, the second sensor 220 may be configured to provide a true volumetric output reading regardless of a shape of waste tank 208 (e.g., irregular shapes). In this regard, greater accuracy of waste water level within the waste tank 208 may be delineated.

Figure 3:
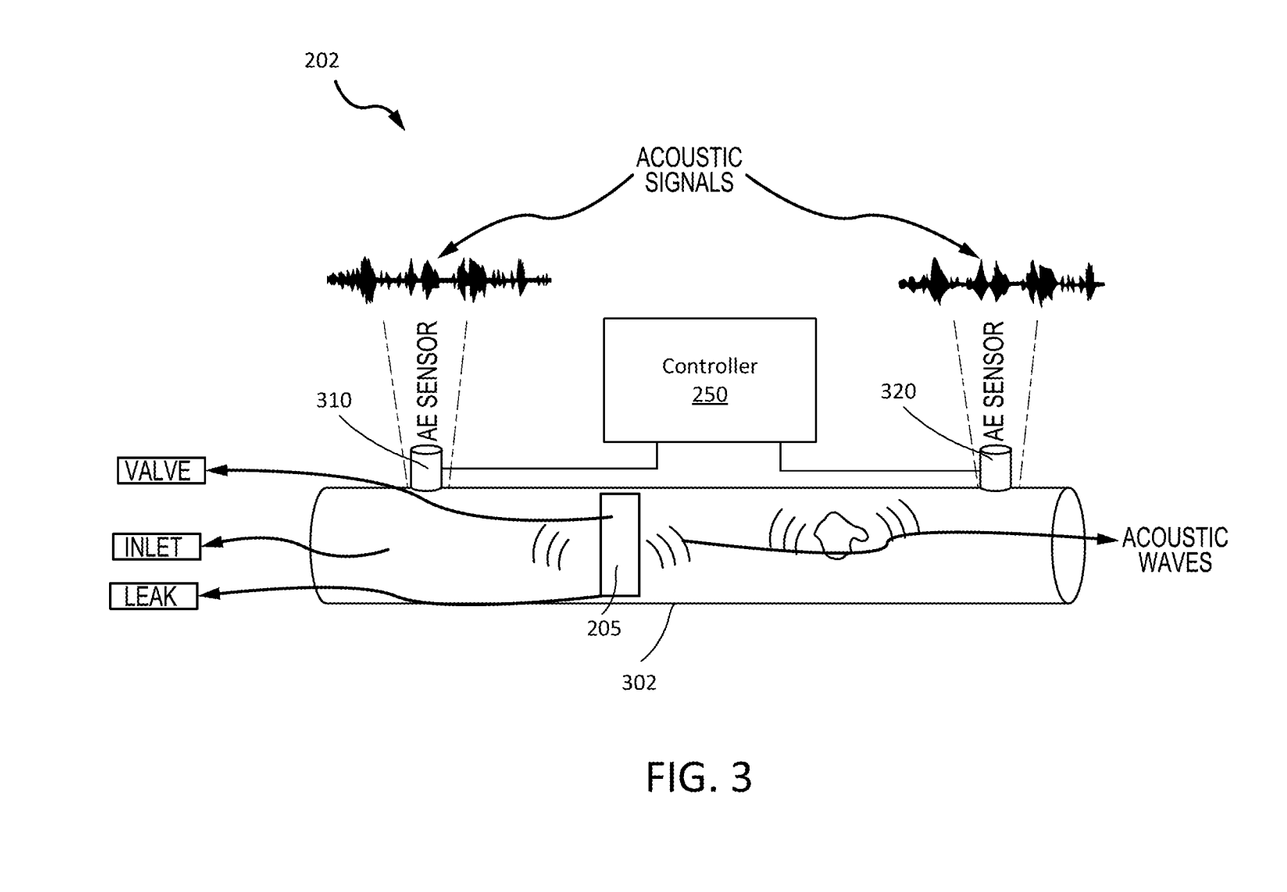
FIG. 3 illustrates a schematic view of a leak detection system, in accordance with various embodiments.

Referring now to FIG. 3, the leak detection system 202 of the plumbing system 200 from FIG. 3 is illustrated, in accordance with various embodiments. In various embodiments, the leak detection system 202 comprises a first AE sensor 310 and a second AE sensor 320. The first AE sensor 310 and the second AE sensor 320 may be disposed on a radially outer surface of a fluid conduit 302 in the plumbing system 200 from FIG. 2. For example, the fluid conduit 302 may be in accordance with fluid conduit 206 or fluid conduit 207 or the like. The valve 205 of the plumbing system 200 from FIG. 2 is disposed axially between the first AE sensor 310 and the second AE sensor 320. Thus, the first AE sensor 310 is disposed upstream of the valve 205 and the second AE sensor 320 is disposed downstream of the valve 205. The AE sensors 310, 320 are configured to detect, track, and measure AE signals as they propagate through the fluid conduit 302. For example, escaping fluid (e.g., at the valve 205) creates an acoustic signal as it passes through a perforation in the fluid conduit 302 or the valve 205.

In various embodiments, the controller 250 may be trained to detect a leak via a leak classifier trained with a neural network (e.g., a deep neural network (DNN), an artificial neural network (ANN), or the like). In various embodiments, any or all of the following variables of the detected acoustic signals may be utilized for leak detection by the controller 250: peak, mean, and/or standard deviation in a time domain and/or skewness, kurtosis, or peak frequency in a frequency domain. In various embodiments, the neural network may determine which variable(s) is/are best suited for determining a leak. In various embodiments, other variables may be utilized alone or in combination with the variables previously mentioned, namely energy, root-mean squared, crest factor, and/or frequency centroid. The present disclosure is not limited in this regard.

In various embodiments, a selection algorithm based on cross entropy may be employed to rank the variables from best to worst for leak detection. In various embodiments, a set of variables may be determined based on the selection algorithm. In various embodiments, leak rates and propagating distances may be factored in to consider the behavior of the variables that are most accurate relative to other variables.

In various embodiments, based on training through the neural network, variable(s) may be determined for use in the leak detection system 202. In this regard, the controller 250 may determine, based on measurements from the AE sensors 310, 320, whether there is a leak proximate the valve 205. Based on a variable set determined from the neural network a leak detection accuracy between 95% and 100% may be obtained. For example, a variable set including peak, mean, frequency, and kurtosis may provide between 95% and 100% leak detection accuracy, in accordance with various embodiments.

In various embodiments, in response to the controller 250 determining a leak is occurring at the valve 205, an indication signal may be sent to display device 260 from FIG. 2. In this regard, a crew member may be informed that a respective valve is leaking and close the valve manually, in accordance with various embodiments.

In various embodiments, the leak detection system 202 and the overflow detection system 201 may be utilized independently or in combination. The present disclosure is not limited in this regard. For example, the leak detection system 202 may be utilized without the overflow detection system 201 and vice versa. Similarly, the first sensor 210 may be utilized without the second sensor 220 and vice versa.

In various embodiments, systems 201, 202 may detect leaking and/or near overflow of a toilet bowl (e.g., toilet bowl 203 or toilet bowl 204) via the valve 205 in advance to prevent the overflow condition. In various embodiments, the systems 201, 202 signals to a crew member that an overflow condition is occurring or about to occur, as opposed to awaiting visual detection by a person, increasing safety and comfortability for passengers. The systems 201, 202 may provide real time monitoring of leakage of the valve 205 and potential overflow of waste water in a lavatory to crew members. In various embodiments, the systems 201, 202 are more accurate and reliable relative to manual detection systems and methods.

Figure 4:
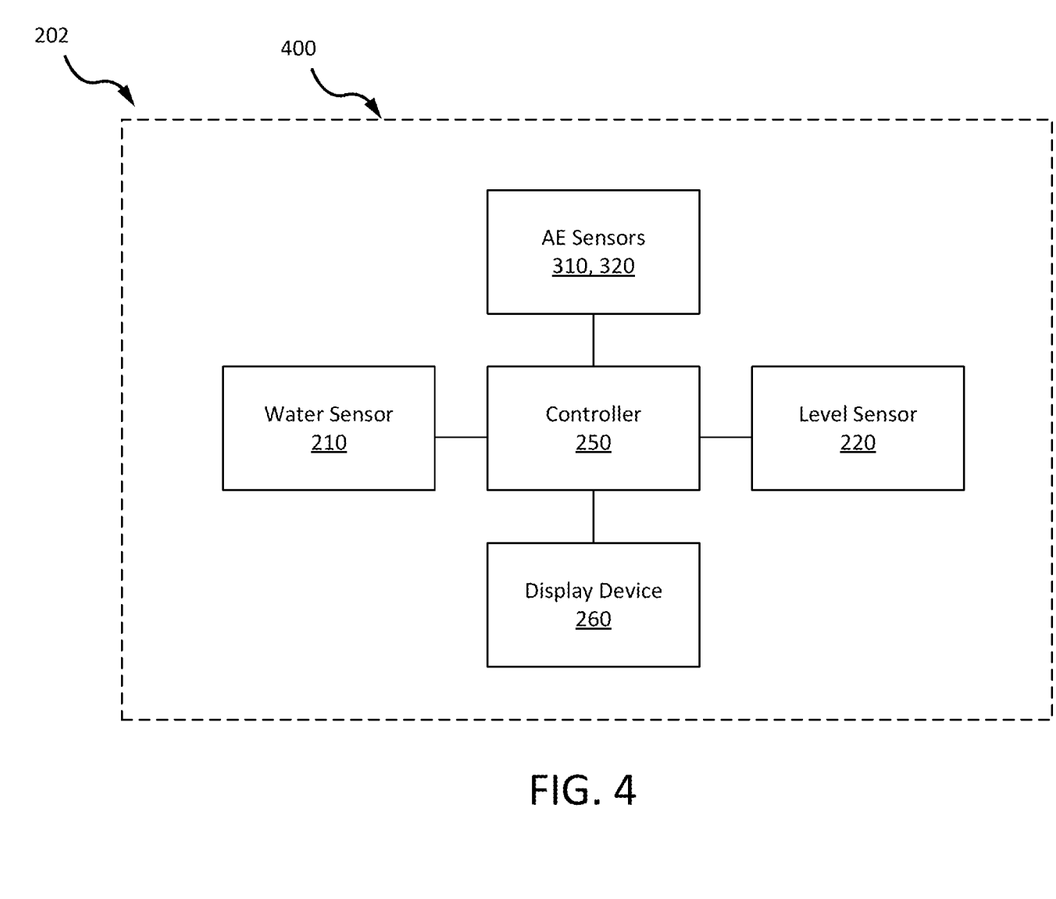
FIG. 4 illustrates a schematic view of a control system, in accordance with various embodiments.

Referring now to FIG. 4, a control system 400 for a leak detection system 202 is illustrated in accordance with various embodiments. The control system 400 may comprise AE sensors 310, 320, water sensor 210, level sensor 220 and the display device 260. In various embodiments, the controller 250 receives acoustic data from the AE sensors 310, 320, water exposure data from water sensor 210, and/or waste level data from the level sensor 220. In this regard, the controller may determine whether an leak and/or overflow condition is occurring based on the combination of data (e.g., acoustic data and water sensor data), in accordance with various embodiments. Thus, by receiving all sets of data in control system 400, a more robust and/or accurate leak/overflow detection system may be created, in accordance with various embodiments.

In various embodiments, the controller 250 is in electronic communication with the inlet shutoff valve 213. In this regard, in response to determining a leak or an overflow condition is occurring, or about to occur, the controller 250 may command the inlet shutoff valve to transition from an open position to a closed position to prevent a flow from the potable water tank 214 into a respective toilet bowl 203, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aircraft, comprising:
   a first lavatory comprising a first sensor disposed in a first toilet bowl;
   a second lavatory comprising a second sensor disposed in a second toilet bowl, the first sensor and the second sensor each comprising a water sensor, the water sensor configured to detect when the water sensor is exposed to water;
   a display device; and
   a controller electronically coupled to the first sensor and the second sensor, the controller configured to:
      receive, via the first sensor, a first signal indicating the first sensor is exposed to water,
      determine a location of the first sensor in response to receiving the first signal,
      transmit a second signal to the display device indicating an overflow condition is about to occur in the first toilet bowl and the location of the first toilet bowl is in the first lavatory, wherein the display device displays an indicator indicating that the overflow condition is in the first lavatory.

2. The system of claim 1, further comprising a first acoustic emission (AE) sensor and a second AE sensor electronically coupled to the controller, the first AE sensor and the second AE sensor configured to be coupled to a fluid conduit, the fluid conduit extending from a potable water source to the first toilet bowl.

3. The system of claim 2, wherein the controller is configured to receive, via the first AE sensor and the second AE sensor, acoustic data.

4. The system of claim 1, further comprising a third sensor disposed in a waste tank, the waste tank in fluid communication with the first toilet bowl during operation of the first toilet bowl, the waste tank in fluid communication with the second toilet bowl during operation of the second toilet bowl, the third sensor electronically coupled to the controller, the third sensor configured to measure a waste water level in the waste tank and send to the controller.

5. A leak detection system, comprising:
   a fluid conduit;
   a valve disposed at least partially within the fluid conduit;
   a first acoustic emission sensor coupled to the fluid conduit upstream of the valve;
   a second acoustic emission sensor coupled to the fluid conduit downstream of the valve; and
   a controller in electronic communication with the first acoustic emission sensor and the second acoustic emission sensor, the controller configured to determine a leak at the valve in response to acoustic data received from the first acoustic emission sensor and the second acoustic emission sensor, wherein:
      the controller is trained to detect the leak via a leak classifier that is trained with a neural network based on one or more variables, the one or more variables comprising:
         peak, mean, and/or standard deviation in a time domain, or
         skewness, kurtosis, or peak frequency in a frequency domain.

6. The leak detection system of claim 5, wherein the fluid conduit extends from a toilet bowl to a waste tank.

7. The leak detection system of claim 6, wherein the toilet bowl is disposed in a lavatory of an aircraft.

8. The leak detection system of claim 5, further comprising a display device, the controller in electric communication with the display device, the controller configured to send an indication to the display device in response to determining the leak at the valve.

9. The leak detection system of claim 5, wherein the controller is further configured to send a signal to the valve to close the valve in response to detecting the leak.

10. A plumbing system, comprising a first lavatory and a second lavatory having the leak detection system of claim 8.

11. The plumbing system of claim 10, wherein the controller is configured to determine whether the first lavatory or the second lavatory has the leak.

12. An aircraft, comprising:
   a lavatory comprising a toilet bowl disposed therein;
   a waste tank;
   a fluid conduit extending from the toilet bowl to the waste tank;
   a valve disposed in the fluid conduit, the valve configured to transition from a closed state to an open state to fluidly couple the toilet bowl to the waste tank;
   a rinse valve disposed fluidly between a potable water source and the toilet bowl;
   a first acoustic emission sensor disposed upstream of the rinse valve;
   a second acoustic emission sensor disposed downstream of the rinse valve;
   a waste water level sensor disposed in the waste tank, the waste water level sensor configured to measure a waste water level within the waste tank;
   a water sensor disposed in the toilet bowl, the water sensor configured to detect when the water sensor is exposed to water;
   a controller electronically coupled to the waste water level sensor, the first acoustic emission sensor, the second acoustic emission sensor, and the water sensor, the controller configured to:
      receive, via the waste water level sensor, the waste water level in the waste tank,
      receive, via the water sensor and responsive to the water sensor being exposed to water, a detection signal indicating an overflow condition,
      receive, via the first acoustic emission sensor and the second acoustic emission sensor, acoustic data
      transmit a first indication to a display device in response to the waste water level exceeding a threshold level,
      transmit a second indication to the display device in response to the detection signal being received,
      determine, based on the acoustic data received from the first acoustic emission sensor and the second acoustic emission sensor, the rinse valve is leaking, and
      transmit a third indication to the display device in response to determining the rinse valve is leaking.

13. The aircraft of claim 12, wherein the water sensor is disposed inside the toilet bowl at a height above an estimated maximum waste water threshold during operation of the toilet bowl.

14. The aircraft of claim 12, wherein the waste water level sensor comprises a fluorinated ethylene propylene (FEP) coating.

* * * * *